US008909742B2

(12) United States Patent
Enstone et al.

(10) Patent No.: US 8,909,742 B2
(45) Date of Patent: Dec. 9, 2014

(54) DISTRIBUTED CONFIGURATION OF NETWORK INTERFACE CARDS

(75) Inventors: Mark R. Enstone, Austin, TX (US); Gaines C. Teague, Austin, TX (US); Charles L. Hudson, Round Rock, TX (US); Robert R. Teisberg, Georgetown, TX (US); David Kasperson, Round Rock, TX (US); Dennis G. Delahoussaye, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2236 days.

(21) Appl. No.: 11/612,434

(22) Filed: Dec. 18, 2006

(65) Prior Publication Data

US 2008/0147828 A1 Jun. 19, 2008

(51) Int. Cl.
*G06F 15/16* (2006.01)
*H04L 12/24* (2006.01)

(52) U.S. Cl.
CPC ........... *H04L 41/0846* (2013.01); *H04L 41/082* (2013.01); *H04L 41/0889* (2013.01)
USPC ........... 709/220; 709/221; 709/222; 709/223; 709/224

(58) Field of Classification Search
USPC ................. 709/220, 221, 222, 223, 224, 225; 717/168
See application file for complete search history.

(56) References Cited

U.S. PATENT DOCUMENTS

| | | | |
|---|---|---|---|
| 6,243,785 B1 * | 6/2001 | Lowe et al. | 710/260 |
| 6,308,205 B1 * | 10/2001 | Carcerano et al. | 709/221 |
| 6,460,093 B1 * | 10/2002 | Taugher | 710/8 |
| 6,693,722 B1 * | 2/2004 | Mixer, Jr. | 358/1.15 |
| 6,701,442 B1 * | 3/2004 | Kunz et al. | 713/300 |
| 6,917,964 B2 * | 7/2005 | Kita et al. | 709/204 |
| 7,131,031 B2 | 10/2006 | Brundridge et al. | |
| 7,420,934 B2 * | 9/2008 | Bertram et al. | 370/255 |
| 2002/0107949 A1 * | 8/2002 | Rawson, III | 709/223 |
| 2003/0120760 A1 * | 6/2003 | Fortin et al. | 709/221 |
| 2004/0010544 A1 * | 1/2004 | Slater et al. | 709/203 |
| 2004/0103278 A1 * | 5/2004 | Abhishek et al. | 713/160 |
| 2005/0114682 A1 * | 5/2005 | Zimmer et al. | 713/187 |
| 2005/0232161 A1 * | 10/2005 | Maufer et al. | 370/252 |
| 2005/0243737 A1 * | 11/2005 | Dooley et al. | 370/254 |
| 2006/0248158 A1 * | 11/2006 | Ha et al. | 709/208 |
| 2007/0061887 A1 * | 3/2007 | Hoover et al. | 726/26 |

OTHER PUBLICATIONS

"Alarm Interface Controller Network Module for the Cisco 2600 and 3600 Series"—Cisco, Jun. 2005 http://www.cisco.com/c/en/us/products/collateral/routers/2600-series-multiservice-platforms/product_data_sheet09186a008010fd25.pdf.*

* cited by examiner

*Primary Examiner* — Randy Scott
(74) *Attorney, Agent, or Firm* — Trenner Law Firm, LLC; Mark D. Trenner

(57) ABSTRACT

Systems and methods for distributed configuration of one or more network interface cards (NICs) are disclosed. An exemplary method comprises issuing a request frame including at least a current configuration generation for the NICs from a host computing device to a network device. The method also comprises returning at least one configuration frame including a newer network configuration for the NICs from the network device to the host computing device. The method also comprises configuring the NICs at the host computing device with the newer network configuration.

20 Claims, 4 Drawing Sheets

DISTRIBUTED CONFIGURATION OF NETWORK INTERFACE CARDS

BACKGROUND

As data centers increase server density, including but not limited to blade servers, server deployment and management continues to be a resource-intensive task. For example, a server administrator typically must log on to each server and individually configure each server for communicating on the network. Oftentimes the server administrator has to input the same or only slightly different information for each server. Accordingly, this can be an inefficient, time-consuming, costly, and potentially error-prone repetitive task.

Although server-image deployment tools may be used to pre-configure each server, this commonly necessitates both the configuration information being known at deployment and that the initial configuration information cannot change over time. Neither of these restrictions is desirable. Some switch-to-switch protocols (e.g., GVRP) do not always readily extend to network-edge devices such as servers. Even if these switch-to-switch protocols could be used with servers, it is not always known how to correctly configure the server's operating system to communicate with the network efficiently in the absence of standards necessary for network protocols. Further, such switch-to-switch protocols communicate what configurations are available, not which configurations should be used (e.g., which VLANs are available, not which VLAN to use). Accordingly, these implementations do not readily allow the benefits of practical I/O virtualization to be extended from the switch-centric view of the network to a cooperating-server inclusive view of the network.

DETAILED DESCRIPTION

Systems and methods of distributed configuration of one or more network interface cards (NICs) are disclosed. In exemplary embodiments, a host computing device (e.g., a server computer or server blade) may configure its NICs, continually monitor for, and act on, reconfigurations of the NICs over time by receiving the network configuration for the NICs from one or more network devices (e.g., a network switch). In addition, the network devices can also be updated so that the most recent version of the network configuration is always available for the hosts in the network. Although not limited in scope, such embodiments are especially desirable in densely networked server installations and/or advanced network configurations, such as virtual LANs and next-generation blade enclosures.

Systems and methods for distributed configuration of network interface cards reduce or altogether eliminate the need to manually or statically configure each network device and/or host computing device. The systems and methods also enable existing server-based network technology (e.g., Hewlett-Packard (HP) Intelligent Networking Pack (INP)) to be dynamically configured from a network-based management element.

In addition, next-generation blade server enclosures may implement technology such as the HP Virtual Connect technology. The HP Virtual Connect technology introduces I/O virtualization to abstract an Ethernet network view of a "bunch of servers," and the server view of the network as a more easily managed virtual view. To make this virtual view of the network more useful, the I/O virtualization layer can be extended into the host computing device. The systems and methods for distributed configuration of network interface cards enable other network components to configure the host computing device with this extension of the virtual network view, and a managing entity for this I/O virtualization also enables reconfigurations, both without the need for manual intervention.

Before continuing, it is noted that that methods and operations described herein may be embodied as logic instructions (i.e., program code implemented in firmware and/or software) stored on one or more computer-readable medium. When executed on a processor, the logic instructions cause a general purpose computing device to be programmed as a special-purpose machine that implements the described methods and/or operations.

Figure 1:
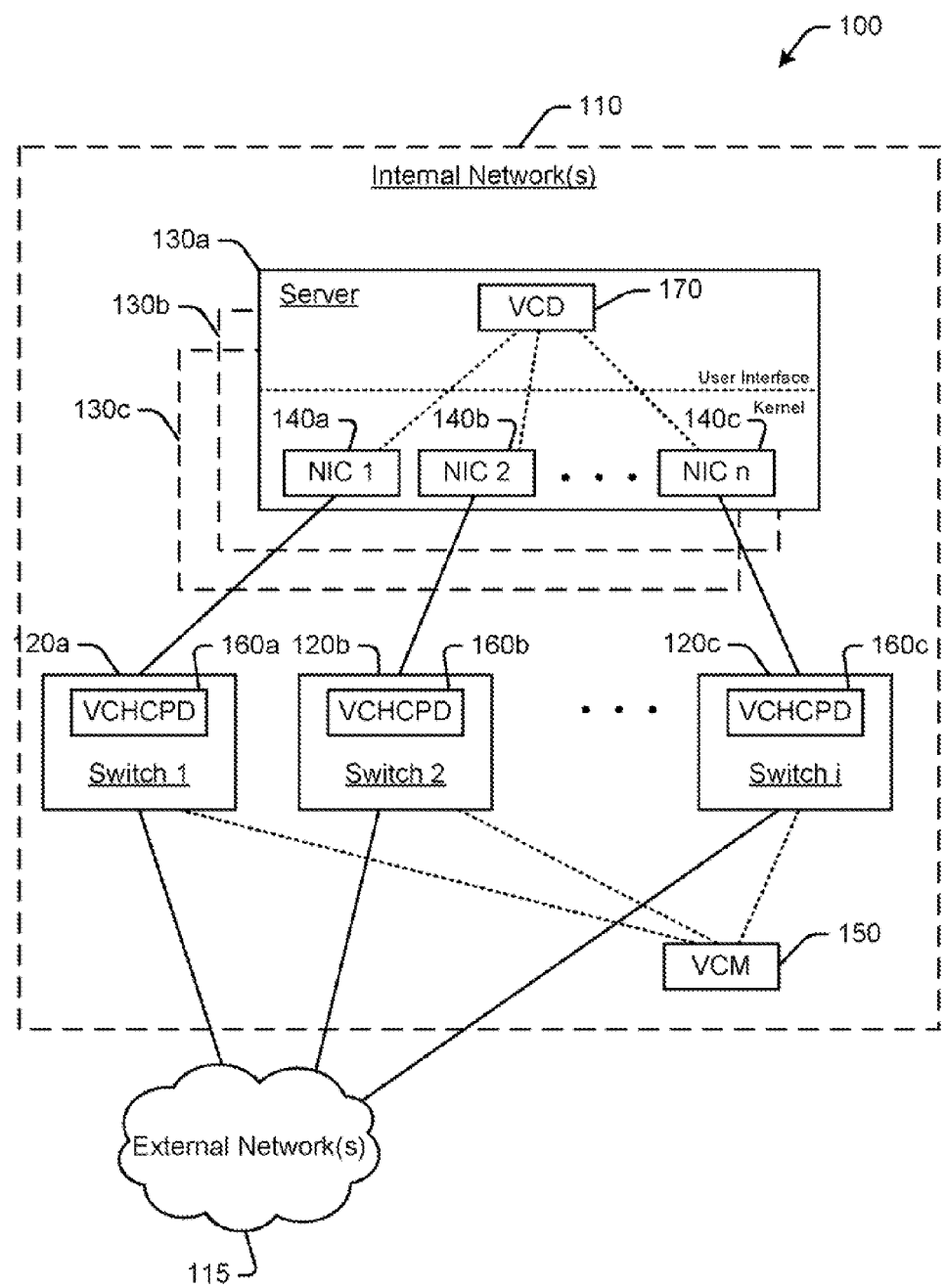
FIG. 1 is a high-level illustration of an exemplary networked computer system which may implement distributed configuration of network interface cards.

FIG. 1 is a high-level illustration of an exemplary computer network 100 which may implement the systems and methods for distributed configuration of one or more network interface cards (NICs). The computer network 100 may include one or more internal communication networks 110, such as a local area network (LAN), communicatively coupled to one or more external communication networks 115, such as a wide area network (WAN). One or more network devices 120a-c (e.g., Switch 1, Switch 2, . . . Switch i, referred to collectively as network devices 120) may be implemented to provide a communications link between host computing devices 130a-c (referred to collectively as hosts 130) and resources available in the internal network 110 and external network 115.

The term "network devices" 120 as used herein refers to a device for establishing, maintaining, and/or handling data communications in the computer network 100. Exemplary network devices may include, but are not limited to, Ethernet and Fibre Channel switches, routers, hubs, and any other device capable of enabling/disabling ports based on the contents of packets and limits exchanges to the links where such exchanges are needed (e.g., another server computer in a peer-to-peer network). The term "host computing device" or "host" 130 as used herein refers to one or more computing systems, such as, e.g., server computers (or blade servers).

It is noted that by embedding VCHCPD in switches, the protocol exchanges may be restricted to the specific links that the NICs to be configured are connected to. Alternatively, a first tier of very simple switches may be implemented between the server NICs and a higher tier of switches incorporating the VCHCPD instances.

It is also noted that both the network devices 120 and host 130 include at least some form of computer-readable storage and at least some degree of processing capability to execute program code for distributed configuration of network interface cards.

The host 130 may include one or more network interface cards (NICs) 140 (e.g., NIC 1, NIC 2, NIC 3, referred to collectively as NICs 140). In an exemplary embodiment, the host 130 may apply virtual NIC configurations by grouping Ethernet ports together and defining virtual interfaces to the grouping. This is achieved in an operating system (OS) specific manner by each host OS. For example, the system administrator may load the configuration onto the host. Standard protocols for this purpose include SMASH/CLP and SMTP. Web-based management or a proprietary management interface would be equally appropriate.

The systems and methods described herein may then be implemented to "push" this network configuration to each of the other hosts 130 so that an administrator does not have to manually configure each host 130. While designed to "push" the network configuration from the network devices 120 to host 130, the information "pushed" is flexible so as to incorporate additional information to configure the host 130 (e.g., iSCSI configuration, etc.). The network configuration may then be applied locally by each host 130.

In an exemplary embodiment, a configuration utility (referred to herein as the Virtual Connect Manage or "VCM") 150 may be provided (e.g., as a user interface or "UI" utility) for initial setup and network configuration. The network configuration may be based on user/administrator input values. The VCM 150 then saves the network configuration to each network device 120, and each network device 120 propagates the network configuration to each host 130.

The network configuration is propagated from network device 120 to host 130 using a configuration protocol. This protocol may be implemented as a host-model protocol. The network device 120 executes a daemon (referred to herein as the Virtual Connect Host Configuration Protocol Daemon or "VCHCPD") 160a-c (referred to collectively as VCHCPD 160) which implements the protocol on the network device 120. The host 130 executes a daemon (referred to herein as the Virtual Connect Daemon or "VCD") 170 which implements the protocol on the host 130.

The VCHCPD 160 executes on the network device 120. The VCHCPD 160 receives the configuration from the VCM 150, passes it into server-specific configurations for each host 130 and "pushes" the respective configuration to the appropriate host 130. The VCHCPD 160 may be implemented as a "long-lived" process executing on the network device 120.

The VCD 170 executes on the host 130. The VCD 170 communicates with the VCHCPD 160 to receive the network configuration for the virtual NICs, and applies the network configuration to the local host 130. On receipt of a network configuration, the VCD 170 groups all available/recognized ports together. The VCD 170 may configure this grouping with the maximum capability possible, including utilizing any or all "for-fee"-licensed features regardless of whether a local license is present or not. The VCD 170 may also create the configured virtual NICs on top of the grouping. The VCD 170 may also apply the VLAN ID, VLAN Name and zero or more Internet Protocol or "IP" configurations to each virtual NIC. For example, an IP configuration may comprise IP Address, IP subnet mask, Default Gateway, Preferred DNS Server, Alternate DNS Server. If no IP configuration is provided for a virtual NIC, it may be configured to receive its IP configuration automatically, e.g., via Dynamic Host Configuration Protocol or "DHCP."

It is noted that the VCD 170 may start automatically or reboot (and on initial install so as not to require a reboot on install). If the VCD 170 determines that it is not operating in a VCHCPD-managed environment, it ceases operating without affecting the runtime or network environments. Otherwise, the VCD 170 executes as a long-lived component ready to receive and apply a new configuration. The VCD configuration state may be retained on the server to facilitate rapid configuration at server start-up. VCD and VCHCPD use a "generation number" as described below to reconcile any changes to the configuration that may have been made while the server was offline.

It is also noted that when the VCD 170 receives a second (or subsequent) new configuration, the a VCD 170 may apply only the changes in configuration rather than tearing down the current configuration and rebuilding a new configuration from scratch. Applying only the reconfiguration changes helps to minimize downtime and disruption to virtual NICs unaffected by the changes to the network configuration.

Figure 2:
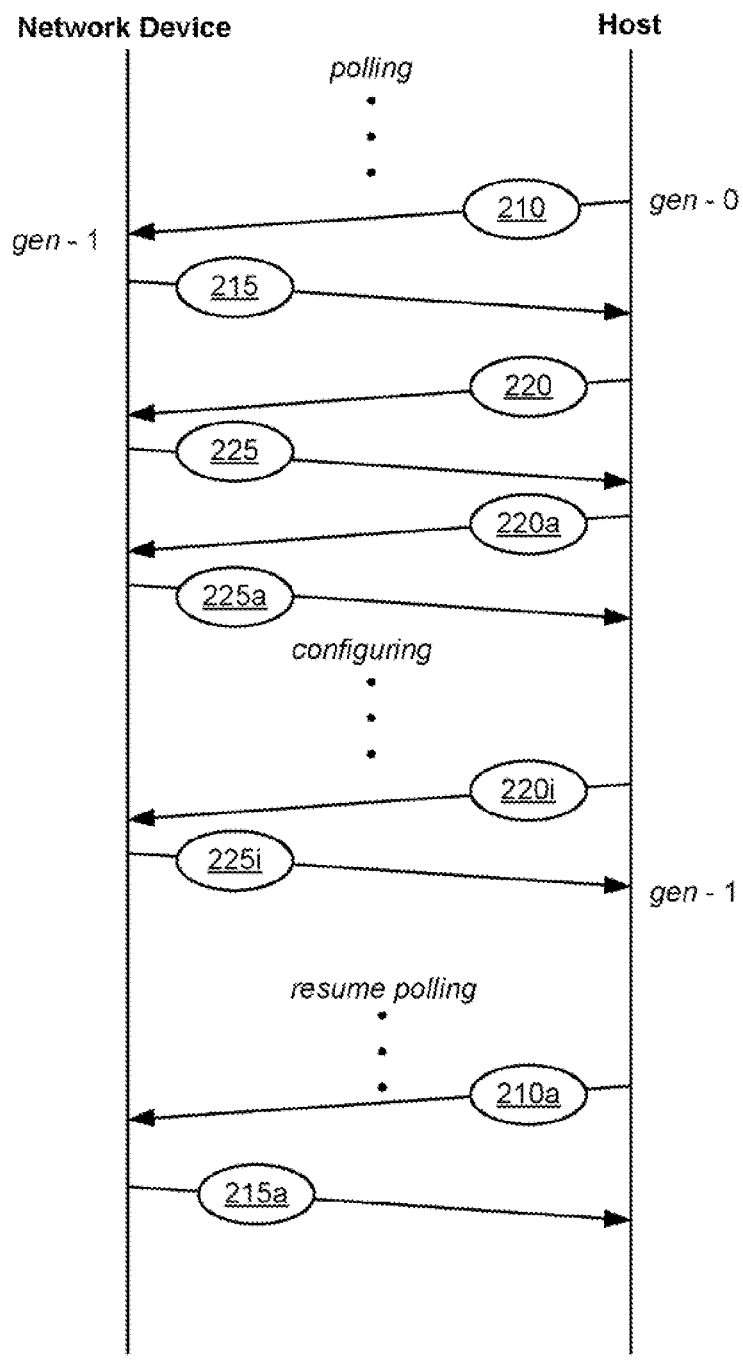
FIG. 2 is a dialog diagram illustrating exemplary communications between a network device and host computing device which may be implemented for distributed configuration of network interface cards.

FIG. 2 is a dialog diagram illustrating exemplary communication 200 between a network device (e.g., switch 120 in FIG. 1) and host computing device (e.g., server blades 130 in FIG. 1) which may be implemented for distributed configuration of network interface cards.

In an exemplary embodiment, the daemon on the network device (e.g., VCHCPD 160) communicates over User Datagram Protocol/Internet Protocol (or "UDP/IP") using two well-known (e.g., assigned by IANA) ports. The frames are Layer-3 multicast using an IEEE multicast address, and are converted to Layer-2 multicast addresses.

Also in an exemplary embodiment, three message types may be used: Discover (e.g., VCDISCOVER{gen, signature}), Request (e.g., VCREQUEST{gen, signature, seq}), and Configuration (e.g., VCCONFIG{gen, signature, config list, more flag}). Each message type may include a signature and generation number pair {signature, gen}. The signature uniquely identifies a network configuration for the host 130 (e.g., a signature incorporating a server identifier such as serial number read from the SMBIOS and a user-provided configuration identifier). The generation number is associated with a particular network configuration version. The generation number is incremented each time the configuration changes. For example, a generation 0 may indicated no network configuration, and larger generation numbers (e.g., generation 1, generation 2, etc.) may indicate newer network configurations.

In the example shown in FIG. 2, the host has not been configured (as shown by the words "gen-0" to indicate the network configuration does not exist yet on the host). However, it is noted that one or more network device and one or more host may poll other network devices and/or hosts in the network, as shown in FIG. 2 by the words "polling." This polling feature may be implemented to continually monitor for updates.

Continuing with this example, the host may issue a Discover frame 210. A Discover frame is an "advertisement" that a particular component (as identified by the signature) believes that the current network configuration has the associated generation number (e.g., gen-0). This gives other components in the network an opportunity to advertise a newer configuration if one is available. In this example, one of the network devices issues a Discover frame 215 identifying that it has a newer network configuration (e.g., gen-1) in response to receiving the Discover frame 210 from the host.

The host may then issue a Request frame 220. A Request frame 220 is issued by a host to request the particular network configuration indicated by the generation number (e.g., gen-1).

For purposes of simplification, the discovery and reply frames are shown as direct communication between the host and the network device. In operation, however, the frames may be issued by the host to one or more network device, which may then multicast the frames to one or more other network device and or host. This is particularly true when the host issuing the discovery request is in an unconfigured state and, accordingly, does not have the capability to communicate directly with any particular network device. It is noted, however, that such multicasting does not confuse the protocol elements because the packets are relatively small and infrequent and can be distinguished by the signatures carried in their payloads. In addition, packets originated by the network devices are different than host originated packets. That is, if a host "sees" packets from another host, these packets are discarded and not acted on.

In any event, after the network device receives the Request frame, the network device may issue one or more Configuration frame 225. A Configuration frame 225 may include a payload specifying the network configuration.

For purposes of illustration, the Configuration frame 225 payload may include two parameters which may be derived from the host's SMBIOS or other persistent storage attached to the server: a signature and a "VCHCP-mode" indicator. The signature may be a value unique to the server (such as a serial number), a user-specified identifier for the network configuration, or a combination of the two, and the "VCHCP-mode" indicator enables the server to determine whether it is in the VCHCP-managed environment. Both parameters may be obtained by the host-resident VCD at startup (at boot time and at install time).

The Configuration frame 225 payload may also include a signature. The host-resident VCD obtains the signature and uses it as its signature in the VCHCP exchange of configuration protocol messages with a network device.

The Configuration frame 225 payload may also include a "VCHCP-mode" indicator. The host-resident VCD reads the "VCHCP-mode" indicator from local persistent storage. If it does not positively identify that this host is operating within a VCHCPD-managed environment, then the VCD exits. Otherwise, the VCD prepares to receive and apply a new configuration. The VCD can treat the positive identification that this host is operating within a VCHCPD-managed environment as a virtual license for "for fee"-licensed features as if a more typical enabling license is present whether or not it is actually present.

The Configuration frame 225 payload may also include Advanced Teaming capabilities. The VCD configures all Ethernet ports into a maximally capable grouping. Such grouping may be done according to all recognized practices such that "legal" groups are created.

During configuration, all features that can be enabled may be enabled. All features that require configuration to a range may be set to the "best"-end of the range in accordance to recognized practices of grouping. Bidirectional traffic transfer on all grouped network ports may be enabled in accordance with recognized best practices (e.g., disabling link aggregation if an Ethernet port is configured for iSCSI use). Offloading as many capabilities as possible may be enabled in accordance with recognized best practices.

It is noted that the Configuration frame 225 payload may not fit within a single packet. In such cases, the Configuration frame 225 payload may indicate that additional packets follow (e.g., by setting the "more flat" bit to true or false). The host may then issue another Request frame, and the network device may issue another Configuration frame, and so forth until all of the network configuration has been transferred to the host (as indicated by Request frame 220*a-i* and Configuration frame 225*a-i* in FIG. 2).

The host may then apply the network configuration so that it is the same as currently available from the network device, as indicated in FIG. 2 by the words "gen-1" on the host-side. Polling (e.g., indicated by Discover frames 210*a* and 215*a*) may resume on a regular, periodic, or other defined basis, to continually monitor for updates.

Figure 3:
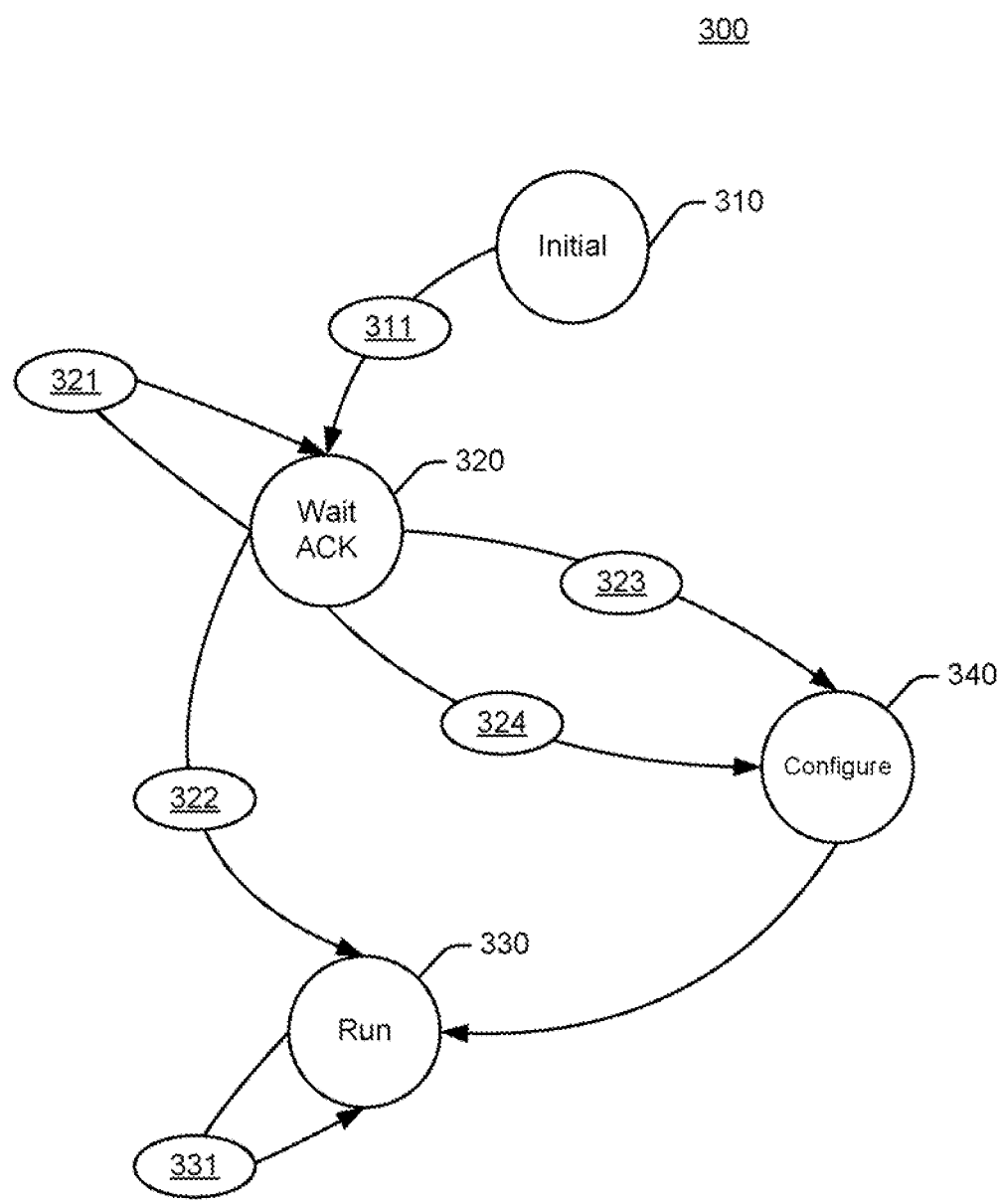
FIG. 3 is a host-side state diagram illustrating exemplary operations which may be implemented for distributed configuration of network interface cards.

FIG. 3 is a host-side state diagram illustrating exemplary operations 300 which may be implemented for distributed configuration of network interface cards. In this example, a host (e.g., host 130 in FIG. 1) issues a Discovery frame 311 from an initial state 310. The host then enters a wait for acknowledgment state 320.

During the wait for acknowledgment state 320, if the host receives a Discovery frame 321 indicating an older generation of the network configuration than is already resident on the host, the host continues in the wait state 320. If the host receives a Discovery frame 322 indicating the same generation of the network configuration that is already resident on the host, the host may continue operations in a run state 330.

Also during the wait for acknowledgement state 320, if the host receives a Discovery frame 323 indicating a newer generation of the network configuration than is already resident on the host, or if the host receives a Discovery frame 324 indicating a different signature (e.g., the host has been moved to a different physical network), the host enters a configuration state 340. In the configuration state 340, the host may receive Configuration frame(s) from the network device. The host may then continue operations in run state 330 after applying the new network configuration.

It is noted that the host may check for updates during the run state 330 by issuing another Discovery frame 331 periodically, regularly, or at some other predefined timing.

Figure 4:
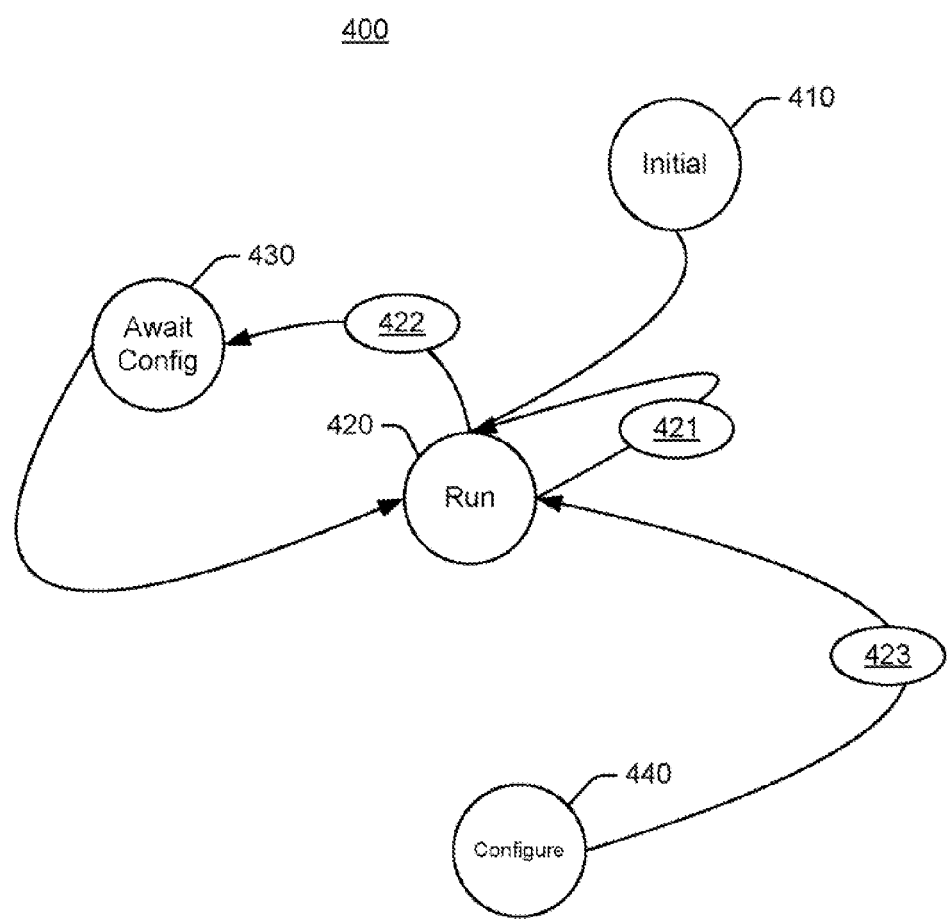
FIG. 4 is a network-side state diagram illustrating exemplary operations which may be implemented for distributed configuration of network interface cards.

FIG. 4 is a network-side state diagram illustrating exemplary operations 400 which may be implemented for distributed configuration of network interface cards. In this example, a network device (e.g., network device 120 in FIG. 1) moves from an initial state 410 to a run state 420.

During the run state 420, the network device may issue a Discovery frame 421. If the network device receives a reply from another network device (or from a host) indicating an older generation of the network configuration is resident on the network device, the network device may issue a Request frame 422 and enter an await configuration state 430 until it can be updated. Accordingly, the outdated network configuration is not propagated within the network. After receiving a configuration update, the network may return to the run state 420.

Also during the run state 420, the network device may receive a Discovery frame 423 from a host. If the network device has a newer generation of the network configuration than is already resident on the host, or if the host receives a Discovery frame 423 indicating a different signature (i.e., the host has been moved to a different physical network), the network device may enter a configuration state 440. In the configuration state 440, the network device may issue Configuration frame(s) to the host. The network device may then return to the run state 420.

It is noted that the network device may check for updates during the run state 420 by continuing to issue Discovery frame 421 periodically, regularly, or at some other predefined timing.

The exemplary embodiments shown and described are provided for purposes of illustration and are not intended to be limiting. Still other embodiments are also contemplated.

The invention claimed is:
1. A method for distributed configuration of one or more network interface cards (NICs), comprising:
after initially properly configuring each of the one or more NICs, continually monitoring for and acting on reconfigurations of the NICs over time, by:

issuing a request frame including at least a current configuration generation for the one or more NICs from a host computing device to a network device;

receiving at least one configuration frame including a newer network configuration for the NICs from the network device at the host computing device; and configuring the NICs at the host computing device with the newer network configuration.

2. The method of claim 1, wherein the NICs are virtual NICs.

3. The method of claim 1, wherein issuing the request frame occurs even before the one or more NICs are configured for communication in the computer network.

4. The method of claim 1, further comprising polling the network device on a predetermined basis for updates to the network configuration.

5. The method of claim 1, further comprising continuing to return at least one configuration frame until a more flag in the configuration frame is false.

6. The method of claim 1, further comprising multicasting a discovery frame from a single port on the network device in response to receiving a discovery frame from the host computing device.

7. The method of claim 1, further comprising ignoring older configuration generations received by the host computing device.

8. The method of claim 1, further comprising updating the network device if the host computing device has a newer configuration generation than the network device.

9. The method of claim 1, further comprising automatically entering a wait state by the network device until the network device has a newer configuration generation than the host computing device.

10. A system for distributed configuration of one or more network interface cards (NICs) in a computer network, comprising:

at least one host computing device communicatively coupled to at least one network device resident in the computer network, the at least one host computing device after initially configuring each of the one or more NICs, continually monitoring for and acting on reconfigurations of the NICs over time, with:

a first daemon executing at the at least one host computing device, the first daemon issuing a configuration request to the at least one network device; and a second daemon executing at the at least one network device, the second daemon returning a newer generation network configuration to the first daemon for configuring NICs at the host computing device.

11. The system of claim 10, wherein the NICs are virtual NICs.

12. The system of claim 10, wherein the first daemon is a virtual connect daemon (VCD) and the second daemon is a virtual connect host configuration protocol daemon (VCHCPD).

13. The system of claim 10, wherein the first daemon issues a discovery frame even before the NICs are configured for communications in the computer network.

14. The system of claim 10, wherein the first daemon continues to poll the resident network device to check for newer generation network configurations for the host computing device.

15. The system of claim 10, wherein the first daemon ignores older generation network configurations returned from the computer network in response to issuing the configuration request.

16. The system of claim 10, wherein the second daemon multicasts an acknowledgement frame from a single port on the network device.

17. The system of claim 10, wherein the second daemon does not respond to the configuration request if a newer generation network configuration exists at the host computing device than exists at the network device.

18. A system for distributed configuration of one or more network interface cards (NICs), comprising:

after initially configuring each of the one or more NICs, continually monitoring for and acting on reconfigurations of the NICs over time, with:

means for handshaking a host computing device with a resident network device;

means for requesting by the host computing device a network configuration of the NICs from the resident network device; and means for receiving a newer network configuration of the NICs at the host computing device without user intervention.

19. The system of claim 18, wherein the NICs are initially unconfigured for communication in the computer network.

20. The system of claim 18, further comprising polling means for continuously updating the network configuration of the NICs.

* * * * *